United States Patent Office 2,698,558
Patented Jan. 4, 1955

2,698,558

METHOD OF PREPARING FELTED PRODUCTS CONTAINING GLASS FIBERS

Don Milligan Hawley, Geneva, and John C. Williams, St. Charles, Ill., assignors to Hawley Products Company, St. Charles, Ill., a corporation of Delaware No Drawing. Application January 17, 1952,
Serial No. 267,018

12 Claims. (Cl. 92—55)

This invention relates to compositions containing glass fiber materials, to products made therefrom and to a wet processing method for the manufacture of new accreted articles.

It has long been recognized that glass fibers have certain properties which make them especially suitable for use in molded products in which it is desirable to have high flexural strengths and high impact strengths. Glass fibers are extremely strong when pulled longitudinally and they have exceptional resistance to heat and corrosive atmospheres.

In commercial practice, glass fibers are usually processed in a dry way, for example, by air felting. Such air felted materials can be impregnated with resins and molded to produce various kinds of articles. Dry felting has many disadvantages such as the requirement for precaution against hazards to workers caused by airborne fine glass particles, difficulty in controlling the density of the air felted article and non-uniformity. Although wet felting of glass fibers has been suggested in the art, the suggested procedures have not given the desired results.

Ordinary glass fibers when compounded in the manner employed in paper and pulp making tend to form an unworkable mass. Bundles of glass fiber filaments such as have been used heretofore in the textile and plastic industries tend to pull apart in water into fine glass fibers which form soggy, cottony masses that are unsuitable for wet felting or accretion onto porous formers. Flat pads made from such glass fibers by wet felting methods have insufficient wet strength to enable them to be removed from the felting apparatus and insufficient dry strength to enable them to be impregnated with a resin and molded into a desired object.

In our copending application, U. S. Serial No. 189,040, filed October 7, 1950, we have described certain wet processing methods for manufacturing fiber glass-containing compositions which depend upon the use of glass filament bundles precoated with a sufficient amount of a water insoluble coating material that they will not come apart in water readily and are still flexible.

One of the objects of the present invention is to provide a wet felting process utilizing the ordinary glass filament bundles or rovings of commerce.

Another object is to provide a new and improved method of preparing glass fiber containing preforms which have sufficient wet strength to permit their removal from a porous form while still wet.

An additional object is to provide a new and improved method of preparing a glass fiber containing contoured preform by wet processing methods such that the resultant article when dried has sufficient dry strength that it can be impregnated with resins and will withstand the mechanical action of molding dies without tearing during the closing of the dies.

A further object is to provide a simplified method for wet processing glass fibers.

A still further object is to provide a new and improved method for incorporating resins with glass fibers.

Another object of the invention is to provide new and improved felted compositions and molded articles which contain glass fibers.

A further object of the invention is to provide new and improved glass fiber- and resin-containing felted articles.

Still another object of the invention is to provide new and improved glass fiber- and resin-containing felted and molded articles. Other objects will appear hereinafter.

In accordance with this invention we have found that new and improved results in the wet processing of glass fibers for use in making sheets and molded articles having substantial wet strength and high flexural strength can be obtained by mixing cut bundles or rovings of glass filaments in water with a fusible, uncured or incompletely cured, thermosetting resin having an affinity for the glass, substantially curing the resin on the glass fibers in the wet, and felting or accreting sheets or contoured articles from the resultant mixture. The resin should be added to the water before the glass fibers or a sufficiently short time thereafter that the glass filaments do not come apart to a fluffy mass.

The glass fiber ordinarily used for reinforcing plastics and the like is made from glass filaments approximately 0.00038 inch in diameter. About 204 of such filaments are collected in a bundle. A roving consists of about 60 such bundles. For the purpose of the present invention, such bundles or rovings are cut into lengths of about ⅛ inch to 6 inches. As stated above, these bundles or rovings have many excellent properties, but they have never been suitable for wet processing up to the present time. When these thread-like glass filament materials are cut and placed in water, they tend to fall apart and to separate into individual filaments. This tendency is much greater if the glass fibers are beaten in paper and pulp handling apparatus. However, if an uncured resin having an affinity for the glass is added before the bundles come apart it will adhere to the bundles and prevent their disintegration.

The uncured resin, for example, a thermosetting polyester resin is relatively tacky. A sheet or article formed by wet felting or accretion out of the resultant fibrous mixture or bath also contains a tacky resinous surface coating. In some cases this is desirable but where the piece is subsequently molded we have found that exceptionally good results are obtained by substantially curing the resin on the fiber in the wet before felting or accreting the fibers into the desired article. This furnish keeps well in the felting tank.

If the resin used is a polyester resin, curing in the wet can be effected by heating the resin-fiber mixture to a temperature above about 120° F., preferably 160° to 212° F. This procedure is an important feature of the invention.

Thermosetting polyester resins are cured in the presence of an oxygen supplying catalyst, e. g., benzoyl peroxide. An optional but important feature of this invention is the introduction of air or other catalyst destroying agent during the curing of the resin coated fiber in the wet in order to destroy the catalyst at the surface of the resin coated fiber leaving a sticky unset surface layer. This procedure is especially desirable where the resultant felted or accreted material or article is impregnated with additional quantities of an uncured thermosetting polyester resin and then molded. The sticky surface layer makes it possible to bond to the subsequently applied impregnating resin and increases the flexural and impact strengths of the molded impregnated article. The catalyst in the subsequently applied impregnating resin will cause this sticky layer to cure ultimately.

The characteristics of the resin-glass fiber material can be varied by varying the quantity of resin added to the glass fiber material in the wet. We have found, for example, that an increase in the quantity of the resin incorporated with the fiber material tends to produce an agglomeration of the glass fibers. With a weight ratio of resin to total fiber of 2:5 (40% by weight resin) a heavy agglomeration of the glass fibers is obtained. When a felting composition of this type containing, say, 40% resin and 60% of total fibers is used for the accretion or felting of preforms followed by resin impregnation of the preform and molding unusual and striking results are obtained in the final product. If a smaller amount of resin is employed, for example, 20% by weight of resin or a weight ratio of resin to total fiber of 1:5 a medium agglomeration of the glass fibers occurs. By using a still smaller amount of resin, say, 10% by weight of resin or a weight ratio of resin to total fiber of 1:10 it is possible to obtain a very light agglomeration and a rather even distribution of glass fibers in the felted or accreted preforms. In general the amount of resin added to the fibers in the beater should be at least about 5% and not exceeding about 50% by weight of the total fibers.

By employing the felting compositions of the present invention a wide variety of end products can be prepared. Felted or accreted sheets or articles can be made entirely from the cut glass fibers or bundles of such fibers treated with a resin in the wet and then felted or accreted to the desired form out of the felting bath. We have found it to be desirable to incorporate into the felting composition a substantial quantity of fibers other than the cut glass filament bundles. The incorporation of these additional fibers has the advantage of imparting a substantial wet strength to the products made from the felting composition so that they can be removed from the former without tearing. These additional fibers also impart a substantial dry strength to the felted product so that it can be impregnated with a resin and molded between molding dies without tearing at the surface during the closing of the molding dies. We prefer to employ a weight ratio of cut glass filaments to other fibers within the range of 9:1 to 1:9 and preferably within the range of 9:1 to 4:1.

The mixing of the fibers and resin with water is carried out in a breaker or beater capable of agitating and dispersing the fibers in the mixtures. The consistency will vary depending upon the product which is to be made from the felting composition but is preferably within the range of ½% to 6% by weight of fiber and in most cases we prefer to use a consistency around 2% to 3% of total fiber on the weight of the water. The fibers must be beaten until the cut glass filaments are thoroughly distributed in the mixture. It is undesirable, however, to open up the fibers too much. An empirical test which we use to determine the amount of beating is to felt a flat pad 8 inches in diameter from 50 grams of the fiber. If the fiber is beaten too much the felted pad when dry will be fluffy and will be characterized by an uneven thicknes or cross section of as much as ¾ inch. Where the proper amount of beating has been effected the cross section will not average more than ¼ to ½ inch. In general, beating the cut glass filaments from ½ minute to 2 minutes is sufficient for the purpose of the invention. The cellulose may take longer opening or beating.

The product which is obtained by felting an article out of the felting bath is referred to herein as a "preform." This preform may be a sheet or a contoured article. For some purposes the preform may be used as such. However, it is usually desirable to impregnate it with a resin such as, for example, a polyester resin and then to mold the product between dies in a suitable press at temperatures and for a period of time sufficiently long to cure the impregnating resin. The quantity of the impregnating resin may vary but good results are obtained by employing a weight ratio of approximately ⅕ to 2 parts of resin to 1 part of preform. The impregnation of a preform with a resin is not novel per se and has been used heretofore in making articles from air felted glass fibers. It should be noted, however, that when preforms are made by wet processing methods as described herein they readily absorb the resin and the final product has good physical characteristics. If polyester resins are employed the temperature in the press may vary within the range of 220° to 270° F. A period of about 2–5 minutes at these temperatures is usually sufficient to cure the resin. The pressure can be anywhere from 0 to 2000 pounds per square inch and upwards. In low pressure molding operations the pressure required to close the press will usually not exceed 200 pounds per square inch. In order to produce a product high in glass fiber and low in resin (e. g. 25% resin), pressures from 1000 to 2000 pounds per square inch and even higher pressures can be employed.

The invention will be further illustrated but is not limited by the following examples in which the quantities are stated in parts by weight unless otherwise indicated.

*Example I*

The following ingredients were dispersed in 2 gallons of water at 120° F. in the order given 10 grams caroa fiber
20 grams polyester resin (Laminac flexible polyester PDL 7–663 catalyzed with 1% benzoyl peroxide)
40 grams ½ inch cut glass fiber roving A heavy agglomeration of the glass fibers was obtained.

The mixture was agitated and the water temperature was brought to 180° F. and the agitation continued until the fiber was no longer sticky, indicating that the resin had been cured.

A preform felted from this bath contains a very heavy agglomeration of glass fibers and is suitable for impregnation with a thermosetting resin such as a polyester resin followed by molding.

*Example II*

To 2 gallons of water at a temperature of 120° F. there were added the following ingredients in the order named 10 grams caroa fiber
40 grams ½ inch cut glass fiber roving, and after ½ minute of strong agitation
10 grams of the resin described in Example I Medium agglomeration of the glass fiber was observed. The water temperature was brought to 180° F. and agitation was continued until the fiber was no longer sticky.

A preform felted from this composition is suitable for further impregnation with a resin followed by molding.

*Example III*

To 2 gallons of water at 120° F. there were added in the order named 10 grams caroa fiber
40 grams ½ inch cut twisted glass roving, and after ½ minute agitation
5 grams resin of the type described in Example I The tendency for the glass to agglomerate was very slight. The water temperature was brought to 180° F. and the mixture was agitated until the fiber was no longer sticky.

Preforms felted or accreted from this composition are suitable for impregnation with thermosetting resins followed by molding.

*Example IV*

To 2 gallons of water at 120° F. there were added in the order named 5 grams caroa fiber
45 grams twisted glass fiber roving, and after ½ minute agitation
5 grams of resin of the type described in Example I The water temperature was brought to 180° F. and the mixture was agitated until the fiber was no longer sticky, indicating that the resin had been substantially cured. This felting composition is suitable for making preforms by felting them in sheets or accreting them on contoured forms. Such preforms are easily impregnated with polyester resins and the impregnated products are suitable for molding. The preform described in Example IV is softer and more easily impregnated than that described in Example III.

*Example V*

The procedure described in Example IV was repeated using 2 minute agitation of the fiber. This allowed further opening of the glass fiber and it was observed that the packing density was being lost. Samples of the compositioned were felted and it was found that they were becoming lumpy.

Examples I to V show that the agglomeration of the glass can be controlled by controlling the quantity of the resin added to the bath. This is important in making manageable felts, decorative effects and in producing products having a desired impact strength. In Example I agglomeration is accentuated by using a large amount of resin which contacts the glass immediately on its entry into the water. In the other examples the glass was allowed to open or separate before being frozen in position by the resin. Example V results in too much separation of the glass filaments from the bundles to make a good pulp molded preform but the product can be used in paper machine operation. In all of these examples when the glass fibers in the preforms are pressed at the end the fibers do not fan out into filament as is the case with unprotected glass fibers. The first sign of over-separation of the glass is the production of a very thick preform which in this series would be at least ¾ inch for a 50 gram sample of fiber made into an 8 inch diameter pad. Even the lightest resin treatment, as in Example IV, permanently restrained this.

Felting compositions were also made containing 100% fiberglass 1 inch cut roving, but these were found to have a very low wet strength. Felting compositions were made containing a 100% refined caroa fiber, but these were found to have a very low impact strength when impregnated with a resin and molded.

*Example VI*

3 pounds of refined caroa fiber were opened in 180 gallons of water at 120° F. and 4 pounds of Selectron 5208 polyester resin were added to which had been previously added 150 grams of Selectron 5554 blue paste. This is a flexible variety of resin catalyzed with about 1% benzoyl peroxide. The blue paste is an oil soluble or dispersed color.

15 pounds of 1 inch cut glass fiber rovings were now added and the water brought to 180° F. and held there for 20 minutes until the fiber no longer felt sticky. The stock was dispersed in a felting tank at ½% consistency and felted according to the usual pulp molding technique.

Articles felted out of this felting composition were dried by drawing hot air through them and impregnated with Selectron 5003, a relatively rigid or non-flexible polyester resin, in proportions of 2 parts of resin to 1 part dry weight of fiber. The resultant impregnated articles were then molded at a pressure of 200 pounds per square inch at a temperature of 250° F. for 5 minutes. The molded product showed a flexural strength of 16,000 pounds per square inch and an impact strength of 30 notched Izod.

*Example VII*

The procedure was the same as in Example VI except that Laminac PDL 7–663 was used as the treating resin instead of Selectron 5208. After the stock had been in the felting tank two days, a test piece was made which showed an impact strength of 17.3 and a flexural strength of 27,600 pounds. After five days the impact strength was 18.1 and the flexural strength 25,300 pounds. The felted preforms were smooth and of good finish. The resin color goes entirely on the glass fiber, giving the final product an interesting pattern.

*Example VIII*

10 parts of refined caroa fiber were opened in a beater for 10 minutes at 120° F. then mixed with 40 parts of ¾ inch twisted glass fibers and 5 parts of Selectron 5208 containing about 10% of Selectron 5554 blue paste. About 2% of alum based on the total weight of fiber was added to this composition. Before the alum addition the color adhered to the glass. After the alum addition it dispersed throughout the fiber, making a more uniformly colored product.

*Example IX*

100 grams catalyzed Selectron 5003
10 grams Vinylite SYHM (20% solution)
100 cc. water was emulsified under a colloid mill. This was then poured into 20 gallons of water at 120° F., and with good stirring 500 grams ½ inch twisted glass fiber was added. The resin went on the glass very rapidly without addition of precipitant. The fiber became sticky and it was observed, on further stirring, that the filaments had little or no tendency to unwrap. Where before the glass had made a weak felt which could not be removed from the felter, it now produced an 8 inch diameter test pad (50 grams dry) which pulled 3 pounds immediately after being formed (3 inch clips on opposite sides of the pad). On drying at 250° F., impregnation and molding, it was observed that there was enough strength to prevent tearing during closing of the die. Test: Impact 8.2, Flexural 28,000.

Vinylite SYHM is a polymer of maleic anhydride and styrene which is soluble in dilute aqueous ammonium hydroxide.

In Example IX the fiber was sticky enough to be hard to handle. This stickiness was found to be controllable by several methods, e. g., presence of fines such as asbestos or caroa fiber (10% and above), lowered temperatures, use of less resin, pigmentation of the resin as with clay or chalk and finally soluble di- or trivalent positive ions.

The preferred method, however, consisted in heating the stock until the resin cured. This took 10 to 20 minutes at 180° F., and could be easily followed by pressing a handful of the stock to observe the disapperance of stickiness. This treatment is preferably carried out with air bubbling through the stock to destroy the peroxide catalyst at the resin surface, assuring bonding in the subsequent resin treatment and molding.

*Example X*

20 parts caroa fiber was opened in water under a high speed mixer at 120° F. To this were then added simultaneously
20 parts 1% benzoyl peroxide catalyzed Selectron 5003, colored red with an oil dispersed pigment and
80 parts ¾ inch cut glass roving with agitation in enough water to produce a 3% consistency (97 parts water, 3 parts fiber) and the temperature was held at 190° F. until the fibers were no longer tacky.

It was observed that for 2 minutes the colored resin was associated with both glass and caroa and then it went entirely on the glass. A tray preform was accreted from the resultant felting composition and oven dried.

Dispersion of the stock was excellent, and there was no tendency for the glass fibers to separate; the tiny filaments were encased in the sticky resin. As mixing was continued, agglomerates of approximately 3 glass fibers appeared and persisted. These produced a novel and decorative effect in the final piece. On drying, impregnating with 2 parts by weight of Selectron 5003 containing 1% benzoyl peroxide and molding at 200 pounds per square inch into a tray, the following properties were obtained: Flexural strength 20,000 p. s. i.; impact 16, notched Izod.

*Example XI*

The procedure of Example X was repeated giving the glass 45 minutes agitation. On drying, impregnation and molding as described in Example X the impact was found to be 12 and the flexural strength 18,000 p. s. i. An examination of the stock showed very few free filaments.

*Example XII*

10 grams caroa fiber was opened in
2 gallons of water at 180° F., and
10 grams of catalyzed Selectron 5208 (a flexible type polyester) was added. Air was swept through the stock 40 grams ⅞ inch fiberglass was now added, and after 3 minutes agitation the stock was felted. After drying, impregnation with 2 parts of Selectron 5003 per part of dry fiber, and molding at 200 p. s. i. the flexural was 25,000 p. s. i. and the impact 21.7. The flexible polyester gave less fiber agglomeration and a smoother felt.

*Example XIII*

Five grams of caroa fiber was opened in 2 gallons of water at 120° F. To this were added 45 grams of ½ inch cut fiber glass roving and at the same time 10 grams of a mixture consisting of 1 part American Cyanamid Melmac 2458 (50% solids) and 3 parts Rohm & Haas Duraplex C–55–A (70% solids). The mixture was agitated while heating to 200° F. and then stopped for a dwell for 2 hours at this temperature. The fibers were observed to keep their form without separation or agglomeration. A pad was then felted from this mixture and found to pull 3 pounds in the wet according to the procedure previously described. It was oven dried, impregnated (2 parts of resin per part of pad) with Laminac PDL 7–663 catalyzed with 1% benzoyl peroxide, and molded at 200 pounds per square inch. The flexural strength of the molded product was 9500 and the impact value was 10.

In this example the Duraplex resin is a drying alkyd resin made by cooking phthalic anhydride, glycerine and castor oil. The Melmac 2458 is a butylated melamine resin capable of setting the Duraplex alkyd resin.

*Example XIV*

Five grams of envelope clippings were opened in 2 gallons of water by heating for 15 minutes at 120° F. Then 45 grams of ½ inch cut fiber glass rovings and 5 grams of Selectron 5003 resin catalyzed with 1% benzoyl peroxide were added. Heating and agitation were continued until a temperature of 160° F. was reached. The pad was felted and observed to have the fiber bundles intact. The wet pull according to the procedure previously described equalled 4 pounds. After oven drying the pad was impregnated with Laminac PDL 7-663 as in Example XVI and molded at 200 pounds per square inch. The flexural strength of the molded product was 25,000 pounds per square inch and the impact strength 16.

*Example XV*

Thirty-five grams of northern kraft were opened by beating in 2 gallons of water at 120° F. Ten grams of Selectron 5003 catalyzed with 1% benzoyl peroxide, 15 grams of 1½ inch cut fiber glass roving and 15 cc. of 3% hydrogen peroxide were then added. The temperature was raised to 160° F. and 25 grams of 50% polyvinyl acetate emulsion was added. The mixture was agitated and after 5 minutes the stock was chilled by dilution and 20 cc. of a 10% melamine wet strength resin were added. The stock was felted into a preform and the resultant preform was die dried in vented dies heated to 300° F. The flexural strength of the resultant product was 16,000 pounds per square inch and the impact value was 14, notched Izbod.

In this example the hydrogen peroxide acts similarly to air in inhibiting or destroying the catalyst at the surface of the resin fiber composition. Other water soluble peroxides such as sodium peroxide and the inorganic percompounds, including sodium persulfate, sodium perchlorate, sodium perborate, ammonium persulfate and potassium persulfate can be similarly employed.

*Example XVI*

Five grams of caroa fiber were opened by beating in 2 gallons of water at 120° F. for 10 minutes. To this was added 10 grams of butylated melamine resin consisting of 50% melamine resin dissolved in a mixture of butanol and toluene and 11 grams of 1½ inch cut fiber glass rovings. Thirty-one grams of kraft and 3 grams of rag were separately opened by beating for 3 to 30 minutes and added to the foregoing mixture. The temperature of the resultant mixture was raised to 160° F. with agitation for 5 minutes. 30 grams of a 50% polyvinyl acetate emulsion were added with 20 cc. of Parez 607 (a 10% solution of a melamine wet strength resin). A pad was felted out of the resultant felting composition and die dried at 100 p. s. i. steam pressure for 5 minutes. The resultant die dried piece had a flexural strength of 14,000 pounds per square inch and an impact value of 14, notched Izod.

From the foregoing examples it will be apparent that although the invention is concerned primarily with the making of preforms from glass fibers in the wet the advantages are often measured by the results obtained when the preform is impregnated with additional quantities of resin and molded. In other words, due to the manner in which the preform is made improved results are also obtained in the resin impregnated molded products.

As noted in Example IX, where the preform is subsequently impregnated with another resin, for example, a polyester resin, it is desirable to preserve an uncatalyzed surface which will bond with the impregnating resin. Although this is preferably accomplished by passing air through the felting composition during the partial curing of the resin in the felting bath, we have also been able to accomplish the desired result by adding some uncatalyzed polyester resin to the felting bath just before felting in order to accentuate the tacky surface. This is especially desirable where the resultant product is to be impregnated and then molded. It is not as important where the resultant preform is die dried. The quantity of the uncatalyzed polyester resin added for this purpose is usually within the range of 1% to 5% by weight of the total fiber. Insofar as the present application discloses a second resin addition to the fibrous slurry and the addition of a substance to cause a color to disperse on hydratable fibers, the process is claimed in our copending application Serial No. 468,563, filed November 12, 1954.

The invention is not limited to the employment of a particular kind of resin either in making the preform or in the subsequent impregnation step. In making the felting composition, however, especially good results have been obtained by employing thermosetting polyester resins which are flexible. In the subsequent impregnation step good results are also obtained by employing thermosetting polyester resins and in this step the resins may be rigid or may be mixtures of flexible and rigid resins. Rigid resins can also be used in preparing the felting compositions. Particularly where the preform is die dried we have obtained good results from using rigid resins in the beater.

The polyester resins are well known. These resins are made by reacting a polyhydric alcohol with a polybasic acid or acid anhydride. Usually at least a portion of the acid component is maleic anhydride. The polyhydric alcohol-polybasic acid composition is added to 10 to 40% by weight of a monomeric aryl vinyl compound, such as styrene. For example, a relatively rigid or non-flexible resin can be prepared by reacting 2 moles of ethylene glycol with 1 mole of phthalic anhydride and 1 mole of maleic anhydride for 2 to 4 hours at a temperature of 160° C. in an inert atmosphere such as nitrogen, carbon dioxide or illuminating gas and then adding to the resultant product 10 to 40% monomeric styrene. The resin in this form is liquid and usually has an acid number around 10 to 50. When this liquid resin is heated with a curing catalyst a solid, infusible resin is formed. Selectron 5003 is an example of a polyester resin as above described.

Suitable catalysts are the organic peroxides which are soluble in the hydrophobe or resin phase, e. g. benzoyl peroxide, acetylbenzoyl peroxide, cumene hydroperoxide, para tertiary butyl perbenzoate, and other oil soluble oxygen supplying catalysts.

In order to produce flexible thermosetting polyester resins higher molecular weight polyalkylene glycols, e. g., polyethylene glycol 200, e. g., polyethylene glycol 400, polyoxypropylene glycols and mixed polyoxyethylene-polyoxypropylene glycols are substituted for the ethylene glycol. Laminac PDL and Selectron 5208 are examples of polyester resins of this type.

Instead of styrene other monomeric aryl compounds having an unsaturated side chain can be employed, e. g., vinyl toluenes, vinyl naphthalenes, vinyl ethyl benzenes, alpha methyl styrene, vinyl chlorobenzenes, vinyl xylenes, divinyl benzene, divinyl toluenes, divinyl naphthalenes, divinyl xylenes, divinyl ethyl benzenes, divinyl chlorobenzenes, divinyl-phenyl vinyl ethers and diallyl phthalate. Lower boiling monomers such as vinyl acetate usually are not satisfactory because the reaction which takes place when the resin is cured is very exothermic and the heat would drive off low boiling monomers.

Some thermosetting resins are compounded with driers such as lead and cobalt salts of 2-ethyl hexoic acid, oleic acid, naphthenic acids, and other carboxylic acids. For the purpose of the present invention it is preferred that the resin which is employed in the wet processing of the fiber material be free of such driers.

The glass fiber bundles can be pretreated with substances which increase their affinity for resins as, for example, stearato chromyl chloride, vinyl trichlorosilane and materials of the type disclosed in U. S. Patents No. 2,273,040, 2,359,858, 2,381,752 and 2,401,645.

It is also common practice to coat glass fiber rovings with polyvinylacetate in small amounts and the invention contemplates the use of such fibers as starting materials. The fiber glass rovings used in some of the examples fall in this category. The coating increases the affinity of polyester resins for glass fibers.

It will be understood throughout the specification and claims that we use the expression "fusible resin capable of being cured to an infusible state and having an affinity for said fibers" to include and cover the addition of said resin to glass fiber bundles, the fibers of which have been pretreated with a substance which adheres to said fibers and said resin, such as, for example, polyvinyl acetate, stearato chromyl chloride, and other substances of the type previously described.

As previously indicated, it is desirable in order to improve the wet strength of the preform to incorporate with the fibers a substantial quantity of fine fibers such as, for example, envelope clippings, refined rag, kraft, cotton linters, caroa and other cellulose fibers. Caroa fiber seems to have exceptional properties in distributing the glass fibers throughout the preform. Caroa is a Brazilian pineapple fiber and for the purpose of the invention is preferably subjected to a hammer mill and bleaching operation before use.

We have been able to obtain excellent results by employing a fine glass fiber material in conjunction with the cut fiber glass bundles. The glass material which we have found to be particularly effective has a diameter of 0.00003 inch and below. Other glass fibers which can be used are those having an average diameter from 0.00003 to 0.00006 inch and those having a diameter from 0.00006 to 0.0001 inch. These fine diameter glasses are available commercially and are used for insulation but are not recommended for plastic reinforcement due to their fragility and water solubility. They are of value for the purpose of the present invention because of the high wet strength which they confer on a freshly formed web or felt especially where the teachings of the invention are employed in paper making. Their use also makes it possible to make an article in which the fiber structure is entirely glass. As a result, many novel effects can be produced in the appearance of the article.

Other fibers such as asbestos can also be employed in conjunction with the cut glass filaments.

The fusible resin which is added to the fiber during the wet processing should preferably have a viscosity within the range of 100 centipoises to 2000 centipoises. However, resins having a greater viscosity can be used by diluting them with a solvent such as methyl ethyl ketone. Very low viscosity resins can also be employed by controlling the heating of the felting composition to thicken the resins in situ.

In order to color or dye the fibers of preforms made in accordance with the present invention the fibers may be treated with a mordant such as the stearato chromyl chloride previously mentioned or with alum or other mordants and a basic dye can be incorporated into the felting composition. Examples of such dyes are auramine, basic brown B, saframine T Extra Conc., fuchsine, rhodamine B Extra, methyl violet S Conc., methylene blue ZX, Victoria pure blue B. O., Victoria green, S. C.

The glass fibers can also be colored by coloring the resin with an oil soluble color or with an insoluble pigment, for example, titanium dioxide, calcium carbonate, or any of the phthalocyanine pigments.

Heretofore attempts to use wet processing methods with glass fibers have resulted in very weak wet preforms as well as weak dry preforms. The fibers come unwrapped into filaments filling the tanks with unmanageable, cottony masses which show a great drop of impact in the finished piece and the preforms are quite lumpy. Lumps in the preforms cause extra pressure at that point during molding which expels the resin and gives starved spots. These difficulties have been overcome by the present invention.

The invention provides a method of preventing the filament separation of cut glass fiber rovings in the wet. It also provides a method of agglomerating the cut glass fiber rovings for decorative effects. Additionally it provides a method for improving the wet strength of glass fiber preforms. It also provides a method of improving the dry strength of glass fiber preforms. The wet processing of the glass fibers as described herein makes it possible to produce preforms in which the fibers are well packed. The wet processing of the glass fiber with coloring or opacifying agents makes it possible to produce unique decorative effects. The wet processing procedures herein described also lower the incidence of starved areas and result in the production of smooth preforms. By the practice of the present invention it is also possible to produce high finish fiber glass articles in which the glass does not show.

As will be apparent the invention provides new and useful products composed of hydratable fibers such as cellulose and non-hydratable glass fibers. Not only flat sheets but also molded products such as portable typewriter cases, projector cases, radio, television and phonograph cabinets and housings, drawers, baby buggy bodies, sleds, hobby horses, and luggage can be made from the products of the invention.

The invention is particularly valuable in providing radio speaker diaphragms of improved dimensional stability and tonal quality.

Filters of all shapes and sizes, including tubular filters can be prepared by the practice of the invention and are suitable for filtering oil, water, and other liquids.

Although the felting compositions of the present invention are primarily intended for forming preforms by water laying as on a paper machine or by accreting as by suction of the fibers against a porous former it will be understood that these felting compositions can also be used in pressure felting processes where the felting composition is injected under pressure into a porous mold or form.

The term "water wettable hydratable fibers" refers to fibers that swell or hydrate in the presence of water and includes cellulose fibers, asbestos fibers, and very fine glass fibers of the type previously described. These fibers are capable of imparting wet strength to the preform and the product containing cut bundles of resin coated glass fibers distributed through the finer fibers also has substantial dry strength.

The term "fusible" is used herein to describe an uncured or incompletely cured resin (either solid or liquid) which has not been thermoset, as distinguished from a cured resin which is infusible and does not soften or flow when heated.

The invention is hereby claimed as follows:

1. A method of preparing compositions containing glass fibers which comprises mixing cut thread-like bundles of glass fibers in an aqueous slurry with a fusible resin capable of being cured to an infusible state and having an affinity for said glass fibers, substantially curing said resin to a substantially infusible state on said fibers while the mixture is still in said slurry, and felting a product from the resultant mixture.

2. A method of preparing compositions containing glass fibers which comprises mixing together in water to form a slurry cut thread-like bundles of glass fibers and about 5% to 50% by weight of the fibers of a fusible resin capable of being cured to an infusible state and having an affinity for said fibers, curing said resin to a substantially infusible state on said fibers in said slurry, and felting a product from the resultant mixture.

3. A method of preparing felted products containing relatively short thread-like bundles of glass fibers and finer water wettable fibers which comprises mixing water wettable hydratable fibers and cut bundles of glass fibers in water to form an aqueous slurry in a weight ratio within the range of 1:9 to 9:1 in the presence of about 5% to about 50% by weight of the total fibers of a fusible resin capable of being cured to an infusible state and having an affinity for said fibers, said finer fibers being capable of imparting wet strength to a preform made from the resultant composition, curing said resin to a substantially infusible state on the fibers in said slurry, and felting a product from the resultant mixture.

4. A method of preparing felted products containing glass fibers which comprises mixing in water to form a slurry cellulose fibers and cut thread-like bundles of glass fibers in a weight ratio within the range of 1:9 to 9:1 in the presence of about 5% to about 50% by weight of the total fibers of a thermosetting fusible polyester resin which forms a flexible resin when cured, said resin and said glass fibers having an affinity for each other, heating said slurry to a temperature sufficiently high to at least partially cure said resin, and felting a product from the resultant mixture.

5. A method of preparing felted products which comprises mixing in the presence of water to form a slurry cellulose fibers and cut thread-like bundles of glass fibers in a weight ratio within the range of 1:9 to 9:1 in the presence of a fusible resin capable of being cured to an infusible state, said resin and said glass fibers having an affinity for each other, substantially curing said resin in said slurry to a substantially infusible state, and felting a product from the resultant mixture.

6. A method of preparing felted products which comprises mixing in the presence of water to form an aqueous slurry cellulose fibers and cut thread-like bundles of glass fibers in a weight ratio within the range of 1:9 to 9:1 in the presence of a fusible resin capable of being cured to an infusible state, said resin and said glass fibers having an affinity for each other, substantially curing said resin in said aqueous slurry to a substantially infusible state, felting a product from the resultant mixture, drying said felted product, impregnating said dried felted product with a fusible resin capable of being cured to an infusible state, and molding the resultant resin impregnated product while simultaneously curing the impregnating resin to an infusible state.

7. A method of preparing accreted molded products containing glass fibers which comprises mixing in water to form an aqueous slurry cut thread-like bundles of glass fibers and a finer fibrous material in the presence of 5% to 50% by weight of the total fibers of a fusible resin capable of being cured to an infusible state, curing said resin to a substantially infusible state on said fibers in said slurry, accreting a preform onto a porous former from said mixture, and subjecting said preform to molding pressures.

8. A method of preparing molded products containing glass fibers which comprises mixing in water to form an aqueous slurry cut thread-like bundles of glass fibers and a finer water wettable hydratable fibrous material in the presence of 5% to 50% by weight of the total fibers of a fusible resin capable of being cured to an infusible state, curing said resin to a substantially infusible state on said fibers in said slurry, accreting a preform onto a porous former from said mixture, drying said preform, impregnating the dried preform with a fusible resin capable of being cured to an infusible resin and simultaneously molding the resultant product and curing the resin therein to an infusible state.

9. A method of preparing felted products containing relatively short thread-like bundles of glass fibers and finer water wettable fibers which comprises mixing water wettable hydratable fibers and cut bundles of glass fibers in water to form an aqueous slurry in the presence of a quantity of a fusible polyester resin capable of being cured to an infusible state, the glass fibers in said thread-like bundles being coated with a material which adheres to said fibers and said resin, said quantity being sufficient to keep the fibers from separating from said bundles, curing said resin on said fibers to a substantially infusible state while the resin fiber mixture is in said slurry, and felting a product from the resultant mixture.

10. A method of preparing colored compositions containing glass fibers which comprises mixing cut thread-like bundles of glass fibers in an aqueous slurry with a fusible resin capable of being cured to an infusible state and having an affinity for said glass fibers, adding to said slurry a dye capable of coloring said fusible resin, substantially curing said resin to a substantially infusible state on said fibers while said fibers are still in said slurry, and felting a product from the resultant mixture.

11. A method of preparing felted products which comprises mixing water wettable hydratable fibers and thread-like bundles of polyvinylacetate coated glass fibers cut to lengths averaging ⅛ inch to 6 inches in water to form a slurry in a weight ratio of said fibers within the range of 1:9 to 9:1 in the persence of about 5% to about 50% by weight of the total fibers of a thermosetting fusible polyhydric alcohol polycarboxy acid resin which forms a flexible resin when cured and has an affinity for said glass fibers, said polyester resin containing maleic anhydride as a part of the polycarboxy acid component and containing about 10% to about 40% of monomeric styrene together with a benzoyl peroxide catalyst, heating said slurry to a temperature within the range of about 170° F. to about 200° F. until the resultant resin coated fibers are no longer tacky, bubbling air through said slurry during said heating, and felting a product from the resultant mixture.

12. A method of preparing felted products which comprises mixing water wettable hydratable fibers and thread-like bundles of polyvinylacetate coated glass fibers cut to lengths averaging ⅛ inch to 6 inches in water to form an aqueous slurry in a weight ratio of said fibers within the range of 1:9 to 9:1 in the presence of about 5% to about 50% by weight of the total fibers of a catalyzed thermosetting fusible polyhydric alcohol polycarboxy acid resin which forms a flexible resin when cured and has an affinity for said glass fibers, said polyester resin containing maleic anhydride as a part of the polycarboxy acid component and containing about 10% to about 40% of monomeric styrene together with an oxygen supplying catalyst, heating said slurry to a temperature within the range of about 120° F. to about 200° F. until the resultant resin coated fibers are no longer tacky, and felting a product from the resultant mixture.

References Cited in the file of this patent

UNITED STATES PATENTS

| Number | Name | Date |
|---|---|---|
| 1,630,424 | Haanen | May 31, 1927 |
| 2,357,392 | Francis | Sept. 5, 1944 |
| 2,383,066 | McDermott | Aug. 21, 1945 |
| 2,477,555 | Roberts et al. | July 26, 1949 |
| 2,504,744 | Sproull et al. | Apr. 18, 1950 |
| 2,531,504 | Dillehay et al. | Nov. 28, 1950 |
| 2,566,960 | Philipps | Sept. 4, 1951 |

FOREIGN PATENTS

| Number | Country | Date |
|---|---|---|
| 363,716 | Great Britain | Dec. 23, 1931 |
| 497,059 | Great Britain | Dec. 8, 1938 |
| 113,887 | Australia | June 24, 1940 |

OTHER REFERENCES

Callinan et al., "The Electrical Properties of Glass-Fiber Paper," Naval Research Laboratory, May 1951, pages 13 and 14.